United States Patent [19]
Sierens et al.

[11] Patent Number: 6,002,680
[45] Date of Patent: Dec. 14, 1999

[54] LOG-IN METHOD FOR A TELECOMMUNICATION NETWORK, MAIN STATION AND TERMINAL STATION ADAPTED TO PERFORM THE METHOD

[75] Inventors: Christiaan Hendrik Jozef Sierens, Mortsel; Peter Michel Noel Vandenabeele, Lier; Harry Franciscus Ludovica VanHoof, Lille; Kristiaan Johan Hubert Ghislanus Venken, Schilde, all of Belgium

[73] Assignee: Alcatel, Paris, France

[21] Appl. No.: 08/890,160

[22] Filed: Jul. 9, 1997

[30] Foreign Application Priority Data

Jul. 9, 1996 [EP] European Pat. Off. .............. 96201925

[51] Int. Cl.$^6$ .............................. H04B 7/208; H04J 3/16; G05B 23/02
[52] U.S. Cl. ...................... 370/344; 370/346; 340/825.08
[58] Field of Search ..................................... 370/344, 329, 370/330, 337, 346, 347, 431, 442, 449, 461, 319; 340/825.08, 825.5

[56] References Cited

U.S. PATENT DOCUMENTS

| | | | |
|---|---|---|---|
| 4,924,461 | 5/1990 | Amemiya et al. | 370/95.2 |
| 5,132,680 | 7/1992 | Tezuka et al. | 340/825.08 |
| 5,166,675 | 11/1992 | Amemiya et al. | 340/825.08 |
| 5,375,140 | 12/1994 | Bustamante et al. | 375/1 |
| 5,419,777 | 5/1995 | Kirkham | 370/85.8 |
| 5,467,351 | 11/1995 | Baumert | 370/85.15 |
| 5,469,436 | 11/1995 | Brandner et al. | 370/85.2 |
| 5,564,025 | 10/1996 | De Freese et al. | 395/290 |
| 5,659,787 | 8/1997 | Schieltz | 395/200.56 |

FOREIGN PATENT DOCUMENTS

| | | |
|---|---|---|
| 0321976 | 6/1989 | European Pat. Off. . |
| 0372567 | 6/1990 | European Pat. Off. . |
| 0594353 | 4/1994 | European Pat. Off. . |

OTHER PUBLICATIONS

Patent Abstracts of Japan vol. 18, No. 486, (E–1604), Sep. 9, 1994, and JP–A–61 064601.
Patent Abstracts of Japan vol. 12, No. 235 (P–725), Jul. 6, 1988, and JP–A–63 026758 (Feb. 4, 1988).
"Asynchronous Transfer Mode Transmission on a Passive Optical Home Network", M. van Vaalen, Symposium Record CATV Sessions, Jun. 14, 1991, pp. 97–107.

*Primary Examiner*—Ajit Patel
*Assistant Examiner*—Brian Nguyen
*Attorney, Agent, or Firm*—Ware, Fressola, Van Der Sluys & Adolphson LLP

[57] ABSTRACT

The main station (MS) and possibly also the terminal stations (T1, T2, T3) of a telecommunication network is/are provided with memories wherein historical information (TT1, TT2, TT3, TT4, CT1, CT2, CT3), i.e. information with respect to log-in attempts of terminal stations (T1, T2, T3) in the past, is stored. This historical information is frequently updated and is used during a polled log-in method wherein terminals (T1, T2, T3) are polled either individually or in groups, executed for instance after a network crash or power-down, to limit the number of terminals that has to be polled by the main station (MS) so as to speed up the polled log-in procedure. The performance of the log-in of each single terminal further increases significantly if this terminal is located at a substantially fixed location in the network and if power- and delay information for transmitting upstream identification messages during log-in are also contained by the historical information.

12 Claims, 3 Drawing Sheets

LOG-IN METHOD FOR A TELECOMMUNICATION NETWORK, MAIN STATION AND TERMINAL STATION ADAPTED TO PERFORM THE METHOD

BACKGROUND OF THE INVENTION

1. Technical Field

The present invention relates to a log-in method for terminal stations in a telecommunication network, a main station and a terminal station adapted to perform the method.

2. Discussion of Related Art

Such a log-in method, main station and terminal station which are adapted to perform such a method are already known in the art, e.g. from the article 'Asynchronous Transfer Mode Transmission on a Passive Optical Home Network' from the author M. J. M. van Vaalen from the Royal PTT Nederland N.V. This article is published in the *Symposium Record on Cable TV Sessions* of Jun. 14, 1991, pages 97–107, CCITT. More particularly, paragraph 6 of this article describes an access mechanism or log-in method for terminal stations, called terminals in the cited article, which are coupled to a main station, called HNC or home net controller, via links of a telecommunication network which is a passive optical network in the mentioned article. Terminal access or terminal log-in is controlled and granted by the home net controller which sends a log-in enable message, named polling information, to the terminals whereupon a single terminal, identified by the polling information itself, is allowed to reply with a so called setup message or identification message. The single terminal transmits the setup message only when it is connected to the home net controller and when it desires to become operational in the network. All terminals known by the home net controller are polled regularly and only one unique terminal at a time gets the possibility to reply to the polling information. Such terminal polling may be very time-consuming, certainly if the number of terminal identifiers that has to be polled is very high. Moreover, for the fact that only terminals which form part of the telecommunication network and desire to become operational reply with identification or setup messages, no terminal will respond to most of the log-in enable messages broadcasted by the main station. A lot of effort and time is thus wasted.

SUMMARY OF THE INVENTION

An object of the present invention is to provide a log-in method of the above known type, and a main station and a terminal station adapted to perform this method, but wherein the time needed for polling the terminal stations is reduced effectively without reducing the efficiency of the log-in method, i.e. without increasing the risk for upstream contention, or to initiate log-in for a terminal which does not want to.

According to a first aspect of the present invention, a log-in method for use in a telecommunication network including a plurality of terminal stations (T1, T2, T3) and a main station (MS) which has control over log-in of each one of said plurality of terminal stations (T1, T2, T3) in said telecommunication network, said log-in method comprising the steps of:

a. selecting a unique terminal identifier (AT3) corresponding to a single terminal station (T3) of said plurality of terminal stations (T1, T2, T3) of said telecommunication network;

b. broadcasting from said main station (MS) to each one of said plurality of terminal stations (T1, T2, T3) in said telecommunication network a log-in enable message to permit said single terminal station (T3) to attempt to log-in; and c. transmitting from said single terminal station (T3) to said main station (MS) in response to said log-in enable message, a terminal identification message if said single terminal station (T3) elects to become operational;

d. selecting a next unique terminal identifier (AT2) corresponding to a next terminal station (T2) if said single terminal station (T3) does not elect to become operational, and repeating with said next unique terminal identifier (AT2) said steps b and c, is characterized in that for selecting said unique terminal identifier (AT3), said main station (MS) uses adaptable historical information (TT1).

According to a second aspect of the present invention, a main station (MS) for use in a telecommunication network wherein it is coupled to a plurality of terminal stations (T1, T2, T3) for controlling log-in of each one of said plurality of terminal stations (T1, T2, T3), said main station (MS) including:

a. selecting means, for selecting a unique terminal identifier (AT3) corresponding to a single terminal station (T3) of said plurality of terminal stations (T1, T2, T3);

b. message generating means, coupled with an input to an output of said selecting means for providing a login enable message including in one of its fields said unique terminal identifier (AT3);

c. transmitting means, coupled with an input to an output of said message generating means for broadcasting said log-in enable message to said plurality of terminal stations (T1, T2, T3);

d. receiving means, for receiving a terminal identification message transmitted by said single terminal station (T3) if said single terminal station (T3) elects to become operational; and e. control means, coupled between an output of said receiving means and a control terminal of said selecting means for controlling said selecting means in selecting a next unique terminal identifier (AT2) corresponding to a next terminal station (T2) if no said terminal identification message is received within a predetermined time interval starting when said log-in enable message is broadcasted, is characterized in that said main station (MS) is further equipped with:

f. memory means an output of which is coupled to an input of said selecting means for storing adaptable historical information that is used by said selecting means to select said unique terminal identifier (AT3).

According to a third aspect of the present invention, a terminal station (T3) for use in a telecommunication network wherein it is coupled together with other terminal stations (T1, T2) to a main station (MS) for controlling log-in of said terminal station (T3) and each one of said other terminal stations (T1, T2), said terminal station (T3) and said other terminal stations (T1, T2) for communicating with said main station (MS) in a frequency division multiplexed (FDM) way via spectrally separated channels, said terminal station (T3) having a unique terminal identifier (AT3) and including:

a. tuning means, adapted to tune on a channel out of said channels;

b. receiving means, for receiving via a downstream sub-channel of said channel a log-in enable message including a terminal identifier, said log-in enable message for transmission by said main station (MS);

c. message interpreting means, coupled with an input to an output of said receiving means for checking whether said terminal identifier is identical to said unique terminal identifier (AT3) of said terminal station (T3);

d. message generating means, for generating under control of said message interpreting means a terminal identification message including said unique terminal identifier (AT3); and e. transmitting means, coupled with an input to an output of said message generating means for transmitting said terminal identification message towards said main station (MS) via an upstream subchannel of said channel; is characterized in that said terminal station (T3) further is equipped with:

f. memory means an output of which is coupled to an input of said tuning means, said memory means for storing adaptable historical information (CT1, CT2, CT3) to be used by said tuning means to select said channel.

Indeed, if the main station and probably also the terminal stations are equipped with memories wherein historical information, i.e. information with respect to log-in attempts of terminal stations in the near past, is stored, terminal polling can be sped up significantly since the number of terminal stations to be polled may be restricted compared to the known method. Polled log-in methods are traditionally used in situations wherein faster log-in methods fail or are inefficient due to contention of several terminal stations. This is for instance so after a network crash, a power-down, at network start-up, and so on. It is however remarked that the use of the present invention is not restricted to situations wherein huge errors occur. If a terminal logs off and after a certain period of time again desires to log-in, the historical information also may be used. Channel information, power- and delay information for transmission of upstream identification messages from former log-in attempts, and so on, will render the new log-in attempt for that terminal more efficient. Since it can be expected that the terminal stations that desire to become operational after a network crash are identical to the terminal stations which were operational just before the network crashed, it usually will be sufficient to poll only those terminals. Waste of effort for polling terminals which are not connected to the network or which do not desire to become operational is avoided. Obviously, to have an identification of these terminals after a network crash, their identifiers have to be stored in the memory with historical information on a frequent basis. Terminal stations which are not polled because they were not active or not connected to the network at the time the network crashed, may be admitted to log-in via other log-in mechanisms. Such another log-in mechanism is described in the European Patent Application with publication number EP 0594353, entitled 'Initializing terminals in a signal distribution system' from applicant AT&T. Therein, an interactive cable television system is described wherein newly connected terminals are initialized by sending a so called uplink message to the central server on receipt of a downstream broadcasted control message from the central server. All terminals are allowed to reply to the same control message, the terminals are not polled and this allows any terminal station to log-in very fast. In this mechanism however, upstream contention of uplink messages originating from different terminals is not excluded without further precautions and hence, this mechanism is applicable only in situations wherein contention of terminals is expected to occur rarely.

In further accord with the first aspect of the present invention, from the historical information a terminal identifier list can be deduced, the terminal identifier list including terminal identifiers similar to the unique terminal identifier and corresponding to respective terminal stations which have recently logged-in.

This list may have a fixed length so that for instance an identifier of those 10 terminals which have logged-in most recently is memorized. Each time a new terminal station attempts to log-in, the oldest information in the terminal identifier list is deleted and a new entry is added to the list. After a network crash, the main station polls the 10 entries in the list. All terminals which have identifiers that are not contained in the list have to log-in later on, as already indicated above.

Also an additional feature of the present invention is that the historical information further may contain power information and/or delay information. Thus, the terminal identifier list, for a terminal station with a substantially fixed location in the telecommunication network, may further contain power information indicating a power level at which the terminal station transmitted a terminal identification message during its most recent log-in attempt. Similarly, the terminal identifier list, for a terminal station with a substantially fixed location in the telecommunication network, may further contain delay information indicating a delay time interval that was respected by the terminal station between receipt of a log-in enable message and transmission of a terminal identification message during its most recent log-in attempt.

Such power and/or delay information is used by the terminal station with which it is associated to transmit identification messages in future attempts to log-in. Without this information, an iterative procedure wherein the terminal station stepwise increases its transmit power and stepwise adapts its timing for transmission of identification messages, has to be passed through. Terminal stations which are located at a substantially fixed position in a telecommunication network with stable gain are expected to transmit their identification messages always at the same power level and with the same delay interval with respect to receipt of the log-in enable messages. Storing power and/or delay information together with the terminal identifiers will increase the performance of the log-in procedure for each single terminal after a network crash and thus is recommended in such networks wherein terminals have substantially fixed locations. In such networks, the distance from the network terminal to the main station does not change dramatically, so that the power level and delay interval that were used formerly to transmit identification messages may still be used. In-house movements of terminals which result in an additional attenuation that is limited by a maximum amount of e.g. 2 dB have no influence on the power level and delay interval that are used for transmission of identification messages by that terminal. As a consequence terminals which are subjected to such in-house movements may be considered to have a fixed location in view of the present invention. In a network wherein terminals are moving over large distances such as a GSM (Global System for Mobile Communications) network, power- and delay information of former log-in attempts is irrelevant for new log-in attempts and therefore storage thereof is useless in such networks.

Yet another feature of the present log-in method is that the historical information may be updated each time a terminal identification is received. Thus, the historical information may be updated upon receipt of the terminal identification message by the main station.

In an alternative implementation, the information is updated only if the terminal identification message was transmitted by a terminal station of a certain type or class. In such an alternative implementation, for example, the historical information is updated upon receipt of the terminal identification message by the main station if the single terminal station belongs to a certain priority class of terminals.

In the latter implementation, it is possible to give priorities to certain types of terminals. A set top box for instance may be obliged to log-in via another method since its terminal identifier will not be stored in the terminal identifier list, while business users may get the privilege to log-in very fast since their identifiers are stored in the memory with historical information if they have recently logged-in.

Furthermore, a feature of the present invention is that the historical information may contain a set of terminal lists, one list per channel used in an FDM (Frequency Division Multiplexing) network.

In an FDM based telecommunication network, the log-in enable message is sent on a particular frequency chosen by the main station. The terminal station that desires to log-in has to monitor the different downstream channels or frequencies until it recognizes the log-in enable message. Then, the terminal station may reply by transmission of a terminal identification message in the upstream channel which constitutes one channel pair together with the downstream channel wherein the log-in enable message was recognized. In FDM networks, the known log-in method is thus even more time consuming because the terminals have to scan the different channels, one after the other. If the main station memorizes the terminal identifiers of terminal stations which have recently logged-in for each channel, future log-in trials of these terminal stations may be start up via the channel last used by these terminals to log-in.

Still another feature of the present method when applied in an FDM network, is that each terminal station may memorize channels via which it logged-in in the near past. In that case, each one of the plurality of terminal stations memorizes, i.e., stores and regularly updates a channel identifier list which contains references to some of the channels that were recently used by the terminal station to attempt to log-in.

In this way, a terminal station no longer has to monitor all frequencies in a certain order or in a random fashion but can immediately monitor the frequency whereon a log-in enable message was received the last time it logged-in.

BRIEF DESCRIPTION OF THE DRAWING

The above mentioned and other objects and features of the invention will become more apparent and the invention itself will be best understood by referring to the following description of an embodiment taken in conjunction with the accompanying drawing wherein.

DETAILED DESCRIPTION OF THE PREFERRED EMBODIMENTS

Figure 1:
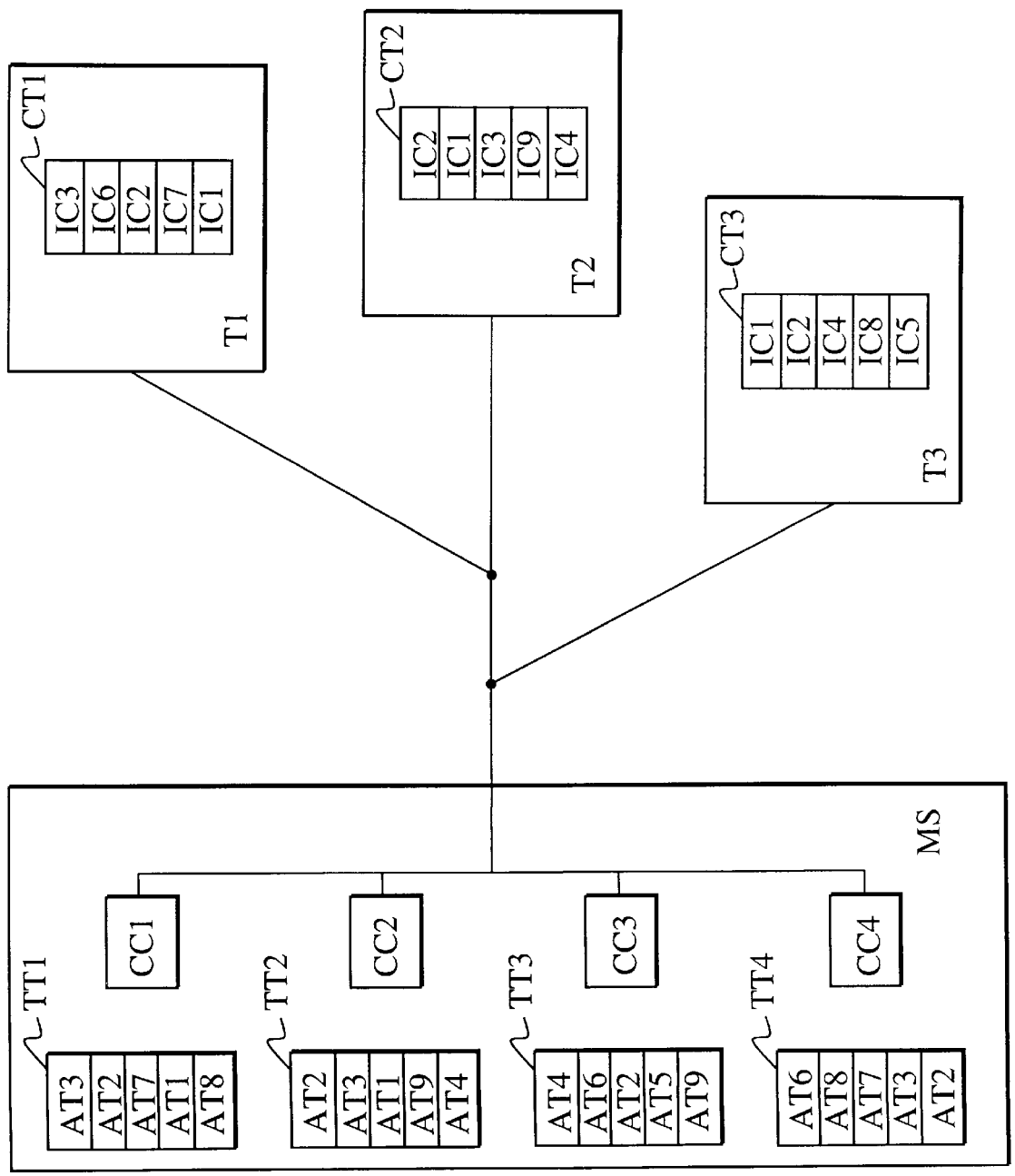
FIG. 1 represents a telecommunication network including a plurality of terminal stations whereof only terminal stations, T1, T2, T3 are shown and which communicate with a main or central station MS in a frequency division multiplexed (FDM) way.

In the following paragraphs, referring to the drawing, a network will be described wherein an implementation of the method according to the present invention is executed. First, the physical network and its architecture will be described. Special attention will be drawn to the parts of the main station MS and terminal stations, T1, T2, T3, which allow performance the log-in method of the present invention. An additional paragraph focuses on the different states or modes of the terminal stations, T1, T2, T3. Particularly relevant with respect to the present invention are the PROVISIONING mode and RANGING mode. The protocol used in these modes will be described in a very detailed way, and the particular situation wherein network terminals attempt to log-in after a network crash will described through step by step. To illustrate that the present method is also applicable to telecommunication networks different from the one drawn in FIG. 1, some pertinent remarks are made in the last paragraphs of this description. These remarks will also allow the reader to distinguish necessary from unnecessary requirements for telecommunication networks wherein the present invention can be applied. As will be understood from these remarks, the present invention is not restricted to use in the network environment of the embodiment described in detail and drawn in FIG. 1.

The physical network drawn in FIG. 1 is a bi-directional electrical/optical network with a point-to-multipoint architecture, such as a hybrid fiber coax (HFC) network. A central station 10 (MS) can communicate with all terminal stations 12, 14, 16 (T1, T2, T3, . . . ) in the network via downstream broadcast of data. Each of the terminal stations T1, T2, T3, . . . on the other hand can communicate with the central station MS via upstream transmission of information in thereto assigned communication channels. Direct communication between two terminal stations, e.g. T1 and T3, is impossible.

Via frequency division multiplexing (FDM), a number of independent channel pairs are available on the network drawn in FIG. 1. Such channel pairs are used in the log-in procedure by a network terminal T2 which desires to become operational. Each one of the channel pairs consists of a downstream channel and an upstream channel. Although this is not a requirement with respect to the present invention, it may be supposed that both the upstream and downstream channel contain one carrier frequency whereon signals are modulated. A terminal station T2 that desires to become operational scans a channel pair when it tunes on to the frequency used for downstream transmission within this channel. The central station MS is equipped with a channel controller CC1, CC2, CC3, CC4, . . . for each channel pair. Each channel controller CC1, CC2, CC3, CC4, . . . is statically linked with the channel pair for which it handles upstream and downstream communication. A terminal station T2 can swap from one channel pair to another. All terminal stations which are, at a certain moment, locked on a channel pair, together with the channel controller which is responsible for the communication via this channel pair at the central side MS, constitute a channel group. As a consequence, channel controller and channel group are statically linked, while terminal stations swap from one channel group to another.

Figure 2:
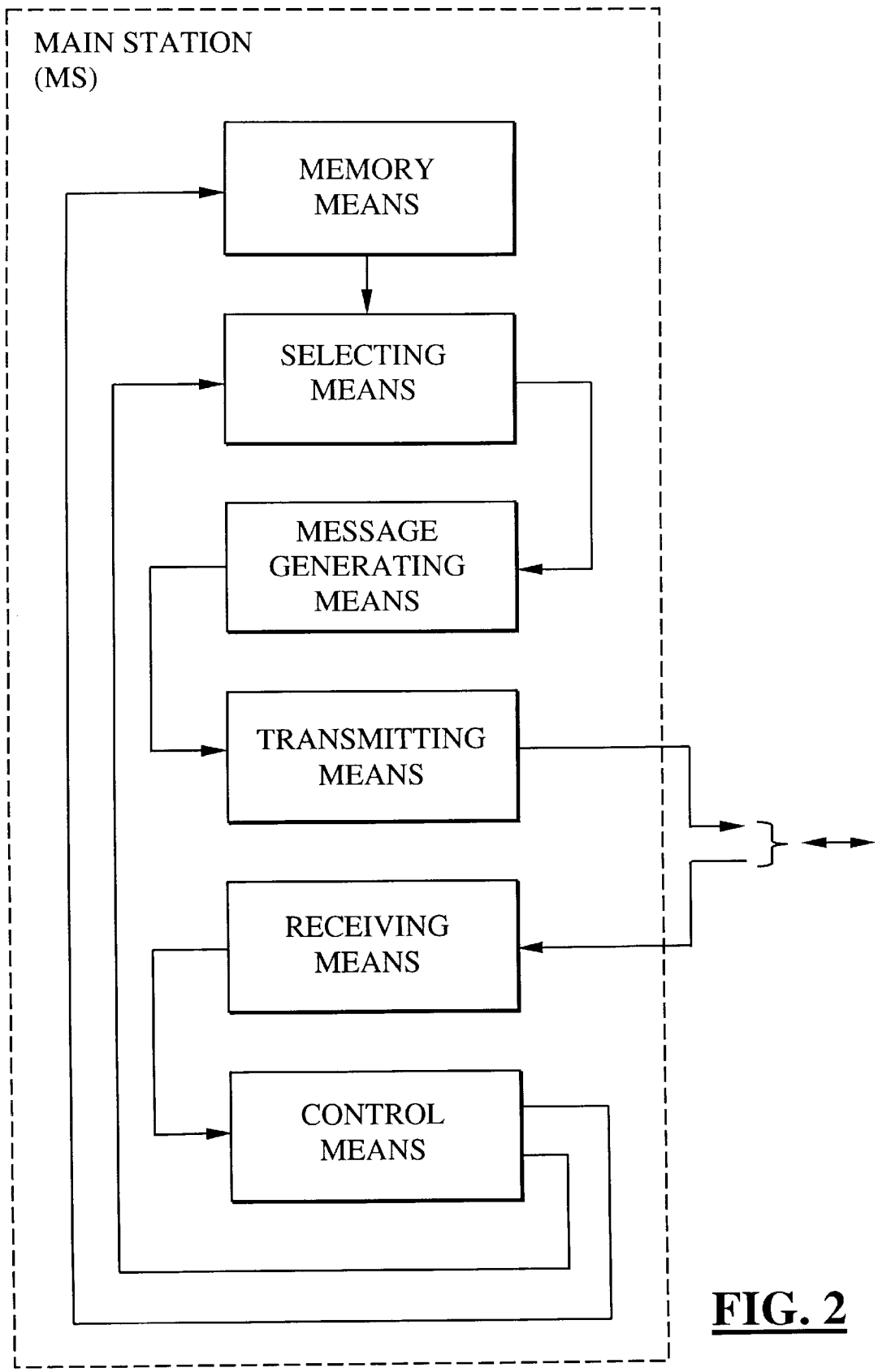
FIG. 2 shows an embodiment of a main station, according to the present invention.

In the central station MS, each channel controller CC1, CC2, CC3, CC4 is associated with a terminal identifier table TT1, TT2, TT3, TT4 stored in a memory with historical information. Such a memory means is shown in FIG. 2, for example. Referring back to FIG. 1, the terminal identifier tables TT1, TT2, TT3, TT4 each contain a fixed length list of terminal addresses. These terminal addresses refer to terminal stations which were recently seen on the associated channel pair. Terminal identifier table TT1 for instance contains a list of five terminal addresses: AT3, AT2, AT7, AT1 and AT8. These terminal addresses characterize terminal stations T3, T2, T7 (not shown), T1 and T8 (not shown) respectively and their presence in terminal identifier table TT1 indicates that they were seen recently on channel pair 1, the channel pair that is controlled at the central station MS by channel controller CC1. The terminal addresses are world-wide unique identification numbers. The terminal address AT1 of a terminal station T1 may for instance be the world-wide unique 48 bit IEEE address proposed by the workgroup IEEE 802.14 of the standardization body IEEE, or it may alternatively be a manufacturing serial number.

As is further seen from FIG. 1 each terminal station, T1, T2, T3 is provided with a channel table, CT1, CT2, CT3 respectively, which is also stored in a memory with historical information. Such a memory means is shown in a terminal station illustrated in FIG. 3, for example. Referring back to FIG. 1, in these channel tables CT1, CT2, CT3, the terminals T1, T2 and T3 keep a list of channel identifiers giving an indication of the channel pairs that were recently used by the terminals T1, T2 and T3 respectively. Terminal T1 for example is provided with a channel table CT1 which contains five channel identifiers: IC3, IC6, IC2, IC7 and IC1. Terminal station T1 thus recently logged-in via the channel pairs controlled by channel controllers CC1, CC6 (not shown), CC3, CC8 (not shown) and CC2. Remark that on the central side MS, only 4 channel controllers CC1, CC2, CC3 and CC4, and on the terminal side, only three terminal stations T1, T2 and T3 are drawn. This choice is made to prevent crowding in FIG. 1.

It is noticed that the above mentioned terminal identifier tables, TT1, TT2, TT3 and TT4, in the central station MS and channel tables, CT1, CT2 and CT3, in the different terminal stations, T1, T2 and T3, may be stored in non-volatile or volatile memories. When stored in non-volatile memories, the information contained therein is still available after for instance a crash of the main station. When stored in volatile memories, the information can be updated at higher frequencies since such volatile memories typically are faster. Volatile information is still available after for instance a network crash but is lost when the main station itself crashes. In the embodiment described below, it is supposed that non-volatile memories are used for storing the historical information. The contents of these nonvolatile memories is copied to volatile RAM (Random Access Memory) before the log-in takes place so that the historical information is faster accessible.

Before focusing on the log-in method that is executed by a terminal station T2 that desires to become operational, an overview of the different modes or states of such a terminal station is given. A terminal station T2 can be in six different modes: the modes OFF, RESET_BUSY, PROVISIONING, HARD_FAILURE, RANGING and OPERATIONAL. In the OFF mode, the terminal station T2 is not able to receive or transmit any information.

Nevertheless any terminal in the OFF mode keeps some information in hard-coded and/or non-volatile memory. The world-wide unique terminal address AT2 is kept in hard-coded memory. Furthermore, the terminal station T2 in a hard-coded way saves references of channels that may be used to tune on for provisioning, and saves the necessary software to scan these channels used for provisioning and to perform the provisioning. In non-volatile memory, the terminal station T2 further stores the latest version of the above mentioned channel table CT2. The hard-coded information together with the historical information in the channel table CT2 will make the log-in method, i.e. the method executed during PROVISIONING and RANGING modes, very efficient. This will become clear later on. In the RESET_BUSY mode, the terminal station T2 performs all actions to prepare for log-in. The hardware registers of the terminal station T2 are self-tested, the channel table CT2 is copied from non-volatile memory to RAM (Random Access Memory) not shown in FIG. 1, parameters are cleared, except those that are stored also in the OFF mode, and the PROVISIONING mode or log-in method will be entered within a predetermined time interval. When entering the PROVISIONING mode, terminal station T2 starts searching for ranging information on provisioning channels. Such provisioning channels may consist of a downstream frequency only. To select and lock on these provisioning channels, terminal station T2 uses hard-coded and stored historical information. It is to be remarked that without historical information, provisioning should always work. When it recognizes this ranging information on a provisioning channel, terminal T2 can interpret the ranging information and can deduce therefrom which one of the channel pairs may be used for ranging. The proposed ranging channel pairs which necessarily consist of an upstream and a downstream channel, are scanned by the terminal station T2 in the RANGING mode in an order determined by the ranging information received via the provisioning channel and/or by the historical information in the terminal T2. When using the historical information in the PROVISIONING mode and/or RANGING mode, the log-in procedure becomes much more efficient. The HARD_FAILURE mode is entered typically when a huge error occurs: a broken cable, a defect channel controller, and so on. In the HARD_FAILURE mode, the terminal station T2 cannot transmit any data anymore but still is capable of receiving provisioning information. After a certain period of time in the HARD_FAILURE, the RESET_BUSY mode is entered automatically. Alternatively, switching from the HARD_FAILURE mode to the RESET_BUSY mode may controlled by interrupts so that, after a huge error, not all terminal stations enter the provisioning mode simultaneously. The latter implementation has the advantage of a lower probability for overloading the PROVISIONING mode. In the RANGING mode, two different situations have to be considered. In the first situation it is assumed that the terminal address AT2 is registered by the central station MS. The central station MS continuously polls through the list of registered terminal stations and successively gives each of these terminal stations the chance to log-in. If however, the terminal identifier AT2 is not registered by the central station MS, the terminal station T2 will have to log-in via what is called an anonymous ranging method in this document. Therein, within timeslots reserved thereto, all terminal stations that are not known by the central station MS are allowed to attempt to log-in. Obviously, without precautions, contention between different terminal stations ranging in an anonymous way will occur. In the OPERATIONAL mode at last, terminal station T2 is fully active and transmits and receives information to and from the central station MS. In an ATM (Asynchronous Transfer Mode) network, this information is encapsulated in ATM cells, but the form wherein the information is transported is irrelevant with respect to applicability of the present invention.

It is assumed now that the network drawn in FIG. 1 has crashed. The last versions of the terminal identifier tables TT1, TT2, TT3 and TT4, associated with the channels 1, 2, 3 and 4 controlled by channel controllers CC1, CC2, CC3 and CC4 respectively are shown in FIG. 1. The terminal identifier tables TT1, TT2, TT3 and TT4 each have a length of 5 entries and are completely filled at the moment the network crashes. Channel pair 1 under control of channel controller CC1 at the moment the network crashes, transports signals between terminal T3 and central station MS. The last terminal that logged in via channel pair 1 is terminal T3, the one but last terminal that logged-in via channel pair 1 is terminal T2, and so on. The terminal identifiers stored in the terminal identifier table TT1 are AT3, AT2, AT7, AT1 and AT8. The most recent entry thereof is AT3, the oldest entry is AT8. Similarly, terminal identifier tables TT2, TT3 and TT4 contain the following terminal identifiers at the moment the network crashes: AT2, AT3, AT1, AT9, AT4; AT4, AT6, AT2, AT5, AT9; and AT6, AT8, AT7, AT3, AT2. At the moment the network crashes, terminals T2 and T3 are operational and communicate with the central station MS via channel pairs 2 and 1 respectively. These channel pairs are controlled on the central side MS by channel controllers CC2 and CC1 and are referred to at the terminal side by IC2 and IC1. As is seen from FIG. 1, IC2 and IC1 are the last entries in the channel identifier tables CT2 and CT3 of terminals T2 and T3 respectively. Terminal T1 is in the OFF mode at the moment the network crashes. Each one of the terminals T1, T2 and T3 keeps a channel identifier table CT1, CT2 and CT3 respectively in its non-volatile memory. These tables CT1, CT2 and CT3 also contain 5 entries and are filled when the network crashes. The last versions of the channel identifier tables CT1, CT2 and CT3 stored before the crash contain the following channel identifiers: IC3, IC6, IC2, IC7, IC1; IC2, IC1, IC3, IC9, IC4; and IC1, IC2, IC4, IC8, IC5.

Immediately after the network crash, terminals T2 and T3 desire to become operational again and can elect to do so, while terminal T1 wants or elects to stay in the OFF mode. To prepare for logging-in, terminals T2 and T3 both pass autonomously through their RESET_BUSY modes and almost simultaneously enter the PROVISIONING mode. It is assumed that terminal T2 preferably uses channels 9 and 10 for provisioning, while terminal T3 preferably uses channels 7 and 8 thereto. This is hard-coded in the respective terminals T2 and T3. The preferred provisioning channels are different from terminal to terminal in a random way so that the probability that provisioning channels get overloaded is minimized. Among the preferred provisioning channels, terminal T2 first tunes on to the channel that was most recently used for provisioning and not to the first hard-coded provisioning channel. Since channels 2, 1 and 3 preferably are not used by terminal T2 for provisioning, the most recent channel that was seen on the network by terminal T2 and that may be used for provisioning is channel 9 with identifier IC9 in channel identifier table CT2. Thus, terminal T2 locks on channel 9 and via the downstream frequency thereof receives the ranging information which tells terminal T2 that all channel pairs from channel pair 1 to channel pair 5 may be used for ranging. At the end of the PROVISIONING mode terminal T2 updates its channel identifier table CT2 by removing the former IC9 entry from the list IC2, IC1, IC3, IC9, IC4, and storing a new IC9 entry which becomes the most recent entry. The channel identifier table CT2 now contains: IC9, IC2, IC1, IC3, IC4. Terminal T2 then goes to the RANGING mode.

In a similar way as described for terminal T2, terminal T3 consults its channel identifier table CT3, locks on channel 8 with identifier IC8 for provisioning and receives via the downstream frequency of channel 8 the ranging information. Channel table CT3 is updated so that IC8 becomes the most recent entry therein. The contents of CT3 now is as follows: IC8, IC1, IC2, IC4, IC5. The older IC8 entry shown in FIG. 1 is removed.

To determine the order in which terminal T2 will tune on to the ranging channels, channel table CT2 is again consulted. The last entry therein of a channel pair used for ranging is IC2. Hence, terminal T2 locks on the downstream frequency of channel pair 2 and tries to recognize thereon a transmit enable message including the unique address AT2 of terminal T2. This unique address AT2 is known by terminal T2 since it is hard-coded therein. Channel 2 is controlled by channel controller CC2. This channel controller CC2 is always in a log-in phase since at any time, a terminal may wish or elect to become operational. In the polled ranging phase, channel controller CC2 admits, i.e., permits or allows some terminals, one after the other, to log-in via channel 2. Channel controller CC2 polls the terminals whose unique address is listed in the terminal identifier table TT2. Channel controller CC2 thus broadcasts transmit enable messages including successively the terminal addresses AT2, AT3, AT1, AT9 and AT4 over the downstream frequency of channel pair 2. Terminal T2, locked on this frequency, recognizes the transmit enable message carrying the terminal address AT2 and replies to this message by upstream transmitting a terminal identification message towards the central station MS. Furthermore, terminal T2 updates channel identifier table CT2 by replacing the older IC2 entry in the list IC9, IC2, IC1, IC3, IC4 by a new one. Table CT2 now contains: IC2, IC9, IC1, IC3, IC4. The upstream frequency of channel 2 that has to be used for the upstream transmission of the terminal identification message, the power level at which the terminal identification message has to be transmitted, and the delay interval that has to be respected by terminal T2 between receipt of the downstream transmit enable message with terminal address AT2 and transmission of the upstream terminal identification message are all communicated to terminal T2 via the transmit enable message with terminal address AT2. It is noticed however that the latter power level and delay interval also may be obtained by terminal T2 from the channel identifier table CT2 if it is supposed that this channel table CT2 also contains power and delay information for each entry.

Terminal T3, having passed the PROVISIONING mode as described above, ranges in a manner similar to terminal T2. Channel table CT3 is consulted. The most recent entry used for ranging therein is IC1. Consequently, terminal T3 locks on the downstream frequency of channel pair 1 and receives thereon a transmit enable message including terminal address AT3 generated by channel controller CC1. Terminal T3 updates its channel table CT3 by replacing the older IC1 entry in the list IC8, IC1, IC2, IC4, IC5 with a new entry for IC1 and further replies with a terminal identification message, upstream transmitted via the upstream frequency of channel pair 1. If this terminal identification message is received by channel controller CC1, the terminal identifier table TT1 is updated. The older AT3 entry is removed from the table and replaced by a new AT3 entry which becomes the most recent entry. Probably, if an entry contains date and time fields indicating the date and time whereon a terminal was last seen on the channel, no entry has to be deleted from the terminal identifier table TT1 but only some fields have to be modified. Terminal T3 now has logged-in, enters the OPERATIONAL mode and can receive and transmit data from and to the central station MS.

After provisioning on channel 9 and ranging on channel 2, also terminal T2 has become operational and the network is again in the situation wherein it was operating before the network crash.

Suppose now that also terminal T1 desires or elects to become operational. Terminal T1 has to provision preferably via channel 6 or channel 7 since this is supposed to be hard-coded in terminal T1. After resetting in the RESET_BUSY mode, terminal T1 consults its channel table CT1 and finds therein an identification IC6 of the channel that was most recently used by terminal T1 for provisioning. Terminal T1 locks on the downstream frequency of channel pair 6 and receives thereon the ranging information which indicates that channels 1 to 5 may be used for ranging. Terminal T1 now enters the RANGING mode and tries polled ranging. Thereto, channel table CT1 is consulted again, this time for obtaining therefrom the most recently used ranging channels. The most recent entry used for ranging therein is IC3. Terminal T1 locks thus on channel pair 3 and tries to recognize a transmit enable message with its own unique address AT1 in it. Since AT1 is not contained in terminal identifier table TT3, terminal T1 after a predetermined time has elapsed, swaps to channel 2 which corresponds to the second entry IC2 in channel table CT1 used for ranging. Channel controller CC2 polls terminal T1 which recognizes the transmit enable message with terminal address AT2, replies with a terminal identification message sent to the central station MS, and additionally enters the OPERATIONAL mode.

Terminals T1, T2 and T3 are operational now and communicate with the central station MS. Terminal table TT2 is updated so that its most recent entry becomes AT1 and channel identifier table CT1 is updated so that its most recent entry becomes IC2. The older entries, AT1 in table TT2 and IC2 in table CT1 are removed from these tables.

Referring now to FIG. 2, an embodiment of a main station (MS), according to the present invention, is shown for use in a telecommunication network wherein it is coupled to a plurality of terminal stations (T1, T2, T3) such as shown in FIG. 1 for controlling log-in of each one of the plurality of terminal stations. The main station is shown having a selecting means for selecting a unique terminal identifier, for example AT3 from the terminal identifier table TT1 of FIG. 1, corresponding to a single terminal station (T3) of the plurality of terminal stations. The selecting means provides a selection signal at an output thereof which is received by a message generating means at an input thereof for providing a log-in enable message including in one of its fields the unique terminal identifier (AT3). This unique terminal identifier is provided by the message generating means on a signal line to transmitting means which in turn provides a broadcast output signal for broadcasting the log-in enable message to the plurality of terminal stations. In response, a receiving means is for receiving a terminal identification message transmitted by the single terminal station (T3) if the single terminal station elects to become operational. In the event the single terminal station (T3) elects not to become operational and hence no terminal identification message is received therefrom within a predetermined time interval starting when the log-in enable message is broadcasted, the receiving means signals such information to a control means which in turn controls the selecting means in selecting a next unique terminal identifier (AT2) corresponding to a next terminal station (T2). According to the invention, the memory means provides to the selecting means stored historical information that is used by the selecting means to select the unique terminal identifier (AT3) and the next unique terminal identifier (AT2) and so on. It does this also under the control of the control means as shown in FIG. 2 which receives information from the receiving means as to which of the plurality of terminal stations has most recently logged in. Thus, the memory means has stored therein historical information which is adaptable according to the recent historical activity of the plurality of terminal stations. This historical information is adaptably stored according to the control means.

Figure 3:
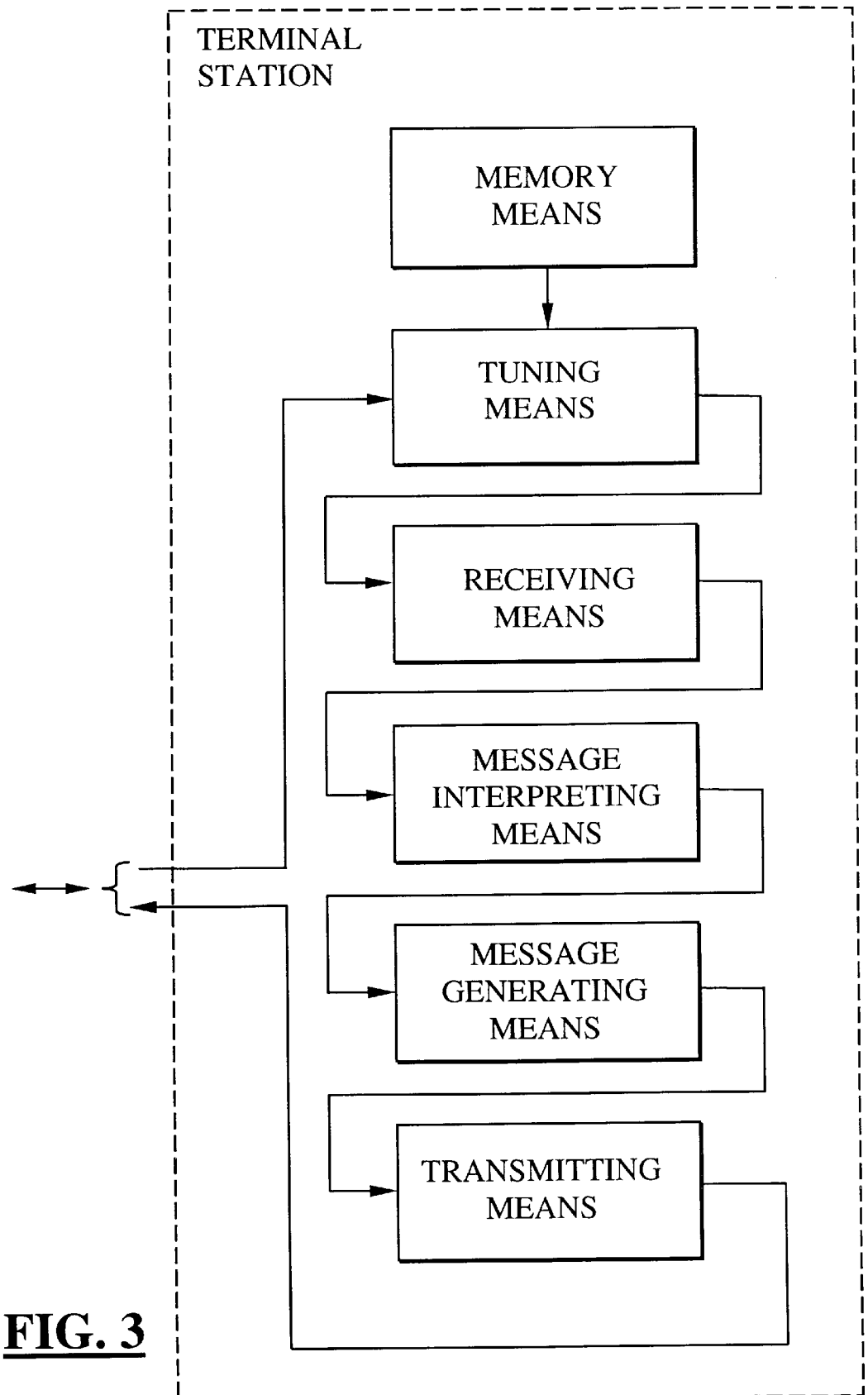
FIG. 3 shows an embodiment of a terminal station, according to the present invention.

Turning now to FIG. 3, a terminal station is shown in detail for use in a telecommunication network such as shown in FIG. 1 wherein it is coupled together with other terminal stations to a main station (MS) for controlling log-in of the terminal station and each one of the other terminal stations. The terminal station and the other terminal stations as well are for communicating with the main station, for example, in a frequency division multiplexed (FDM) way via spectrally separated channels. Each terminal station has a unique terminal identifier, e.g., AT3 as shown in the first entry of the terminal identifier table TT1 of FIG. 1. As shown in FIG. 3, the terminal station includes tuning means which is adapted to tune a channel out of the plurality of channels available. A receiving means is for receiving via a downstream subchannel of the tuned channel, a log-in enable message including a terminal identifier, the log-in in enable message being transmitted by the main station (MS). A message interpreting means has an input coupled to an output of the receiving means for checking whether the terminal identifier is identical to the unique terminal identifier (AT3) of the terminal station (T3). A message generating means is adapted to generate under control of the message interpreting means a terminal identification message including the unique terminal identifier (AT3). A transmitting means has an input coupled to an output of the message generating means for transmitting the terminal identification message toward the main station via an upstream subchannel of the tuned channel. According to the invention, the terminal station of FIG. 3 is further equipped with a memory means having an output which is coupled to an input of the tuning means, the memory means being adapted to store adaptable historical information (CT1, CT2, CT3) to be used by the tuning means to select the channel.

It is remarked that, to be able to apply the present invention therein, the network does not need to have a point-to-multipoint architecture. Any network wherein terminal stations are coupled to a main station which controls the log-in of the terminal stations, e.g. a ring-shaped network with one station having control over all others, can be adapted so that the present method is applicable therein.

The applicability of the present invention also is not restricted to electrical and/or optical networks. Any person skilled in the art will appreciate that the present log-in method for instance also can be used in mobile communication networks wherein terminals are coupled to the main station via radio links, or in satellite communication networks.

Furthermore it is noticed that the above described implementation of the present invention is dedicated to FDM (Frequency Division Multiplexing) networks. If however other multiplexing types, for example TDM (Time Division Multiplexing), are used, the basic idea of the present invention, i.e. reducing the number of terminals that has to be polled during a log-in procedure by using historical information which is frequently updated, can still be implemented. Minor modifications to the above described implementation allow it to be used in a TDM system: no channel identifier tables have to be stored and managed by the terminal stations and only one terminal identifier table has to be stored in non-volatile memory of the central station MS.

Yet another remark is that the entries of the above tables may be adapted to include any information related to the terminals or channels to which they correspond. The above mentioned delay and power information, the date and time information indicating when a terminal was last seen on a certain channel or indicating when a channel was last used for provisioning, the fact whether a channel was last used for provisioning or for ranging, and so on, may all be included in one entry. Obviously, the information constituting one entry determines the amount of non-volatile memory that is required to store this entry.

In the above embodiment it is assumed that the channels that are preferably used for provisioning are identified in a hard-coded way in the terminals. The terminals therein use different provisioning channels. In alternative networks, one single channel may be reserved for provisioning of all terminals. The terminals then immediately scan the single provisioning channel in the network, a reference of which is also memorized in a hard-coded way in the terminals. Such a network further contains a plurality of ranging channels which are also memorized in a hard-coded way by the terminals or which are identified to the terminals via the single provisioning channel, similar to the above embodiment.

In still other networks, the provisioning channels and ranging channels may be identical. In other words, in such networks, the terminals use hard-coded and historical information to lock on the provisioning channel and this provisioning channel is automatically used for ranging. It should be noted that in such networks, the above called PROVISIONING mode and RANGING mode no longer exist as separate modes but are integrated in one single LOG_IN mode.

A further remark is that the present invention also may be applied in networks wherein terminals are polled in groups instead of individually. In such networks, the log-in procedure contains the additional step of defining groups of terminals which are expected not to log-in simultaneously, which more or less are located at the same distance from the main station, which used the same RF channel before, or whatever other criterion. Each one of these groups is than polled. As will be recognized by any person skilled in the art, the historical information consists of a list of group identifiers instead of a list of terminal identifiers. Groups of terminals which contain terminals that recently logged-in will be polled since their identifiers are stored in the memories with historical information. Other groups will get the chance to log-in anonymously.

A last remark with respect to the previously described embodiment, is that the channel pairs mentioned above are data channels which are able to carry the data format, for instance ATM (Asynchronous Transfer Mode) cells via which the terminals T1, T2 and T3 want to communicate with the main station MS. Other channels, defined by the operator of the network, may be dedicated to transport other types of data, such as analog video signals, DVB (Digital Video Broadcast) frames with MPEG encoded data, analog TV signals, cable phone signals, . . . Via the provisioning channel, a terminal is told which channels are defined by the network operator for transporting the data format that this terminal supports. The other channels thus are no longer scanned by the terminal.

While the principles of the invention have been described above in connection with specific apparatus, it is to be clearly understood that this description is made only by way of example and not as a limitation on the scope of the invention.

We claim:

1. Log-in method for use in a telecommunication network including a plurality of terminal stations (T1, T2, T3) and a main station (MS) which has control over log-in of each one of said plurality of terminal stations (T1, T2, T3) in said telecommunication network, said log-in method comprising the steps of:

a. selecting a unique terminal identifier (AT3) corresponding to a single terminal station (T3) of said plurality of terminal stations (T1, T2, T3) of said telecommunication network;

b. broadcasting from said main station (MS) to each one of said plurality of terminal stations (T1, T2, T3) in said telecommunication network a log-in enable message to permit said single terminal station (T3) to attempt to log-in; and c. transmitting from said single terminal station (T3) to said main station (MS) in response to said log-in enable message, a terminal identification message if said single terminal station (T3) elects to become operational;

d. selecting a next unique terminal identifier (AT2) corresponding to a next terminal station (T2) if said single terminal station (T3) does not elect to become operational, and repeating with said next unique terminal identifier (AT2) said steps b and c, characterized in that for selecting said unique terminal identifier (AT3), said main station (MS) uses adaptable historical information (TT1);

in that from said historical information a terminal identifier list (TT1) is deducible, said terminal identifier list (TT1) including terminal identifiers (AT3, AT2, AT7, AT1, AT8) similar to said unique terminal identifier (AT3) and corresponding to respective terminal stations which have recently logged-in; and in that said terminal identifier list (TT1), for a terminal station (T3) with a substantially fixed location in said telecommunication network, further contains power information indicating a power level at which said terminal station (T3) transmitted a terminal identification message during its most recent log-in attempt.

2. Log-in method for use in a telecommunication network including a plurality of terminal stations (T1, T2, T3) and a main station (MS) which has control over log-in of each one of said plurality of terminal stations (T1, T2, T3) in said telecommunication network, said log-in method comprising the steps of:

a. selecting a unique terminal identifier (AT3) corresponding to a single terminal station (T3) of said plurality of terminal stations (T1, T2, T3) of said telecommunication network;

b. broadcasting from said main station (MS) to each one of said plurality of terminal stations (T1, T2, T3) in said telecommunication network a log-in enable message to permit said single terminal station (T3) to attempt to log-in; and c. transmitting from said single terminal station (T3) to said main station (MS) in response to said log-in enable message, a terminal identification message if said single terminal station (T3) elects to become operational;

d. selecting a next unique terminal identifier (AT2) corresponding to a next terminal station (T2) if said single terminal station (T3) does not elect to become operational, and repeating with said next unique terminal identifier (AT2) said steps b and c, characterized in that for selecting said unique terminal identifier (AT3), said main station (MS) uses adaptable historical information (TT1);

in that from said historical information a terminal identifier list (TT1) is deducible, said terminal identifier list (TT1) including terminal identifiers (AT3, AT2, AT7, AT1, AT8) similar to said unique terminal identifier (AT3) and corresponding to respective terminal stations which have recently logged-in; and information indicating a power level at which said terminal station (T3) transmitted a terminal identification message during its most recent log-in attempt characterized in that said terminal identifier list (TT1), for a terminal station (T3) with a substantially fixed location in said telecommunication network, further contains delay information indicating a delay time interval that was respected by said terminal station (T3) between receipt of a log-in enable message and transmission of a terminal identification message during its most recent log-in attempt.

3. Log-in method for use in a telecommunication network including a plurality of terminal stations (T1, T2, T3) and a main station (MS) which has control over log-in of each one of said plurality of terminal stations (T1, T2, T3) in said telecommunication network, said log-in method comprising the steps of:

a. selecting a unique terminal identifier (AT3) corresponding to a single terminal station (T3) of said plurality of terminal stations (T1, T2, T3) of said telecommunication network;

b. broadcasting from said main station (MS) to each one of said plurality of terminal stations (T1, T2, T3) in said telecommunication network a log-in enable message to permit said single terminal station (T3) to attempt to log-in; and c. transmitting from said single terminal station (T3) to said main station (MS) in response to said log-in enable message, a terminal identification message if said single terminal station (T3) elects to become operational;

d. selecting a next unique terminal identifier (AT2) corresponding to a next terminal station (T2) if said single terminal station (T3) does not elect to become operational, and repeating with said next unique terminal identifier (AT2) said steps b and c, characterized in that for selecting said unique terminal identifier (AT3) said main station (MS) uses adaptable historical information (TT1); and in that, if said plurality of terminal stations (T1, T2, T3) communicate with said main station (MS) in a frequency division multiplexed way via channels spectrally separated, from said historical information, a terminal identifier list (TT1, TT2, TT3, TT4) is deducible for each respective channel of said channels, said terminal identifier list (TT1, TT2, TT3, TT4) including terminal identifiers (AT3, AT2, AT7, AT1, AT8; AT2, AT3, AT1, AT9, AT4; AT4, AT6, AT2, AT5, AT9; AT6, AT8, AT7, AT3, AT2) corresponding to terminal stations which have recently logged-in via said respective channel.

4. Log-in method according to claim 3, characterized in that each one (T1) of said plurality of terminal stations (T1, T2, T3) memorizes and regularly updates a channel identifier list (CT1) which contains references (IC3, IC6, IC2, IC7, IC1) to some of said channels that were recently used by said terminal station (T1) to attempt to log-in.

5. Main station (MS) for use in a telecommunication network wherein it is coupled to a plurality of terminal stations (T1, T2, T3) for controlling log-in of each one of said plurality of terminal stations (T1, T2, T3), said main station (MS) including:

a. selecting means, for selecting a unique terminal identifier (AT3) corresponding to a single terminal station (T3) of said plurality of terminal stations (T1, T2, T3);

b. message generating means, coupled with an input to an output of said selecting means for providing a log-in enable message including said unique terminal identifier (AT3);

c. transmitting means, coupled with an input to an output of said message generating means for broadcasting said log-in enable message to said plurality of terminal stations (T1, T2, T3);

d. receiving means, for receiving a terminal identification message transmitted by said single terminal station (T3) if said single terminal station (T3) elects to become operational; and e. control means, coupled between an output of said receiving means and a control terminal of said selecting means for controlling said selecting means in selecting a next unique terminal identifier (AT2) corresponding to a next terminal station (T2) if no said terminal identification message is received within a predetermined time interval starting when said log-in enable message is broadcasted, characterized in that said main station (MS) further is equipped with:

f. memory means an output of which is coupled to an input of said selecting means for storing adaptable historical information that is used by said selecting means to select said unique terminal identifier (AT3), in that from said historical information a terminal identifier list (TT1) is deducible, said terminal identifier list (TT1) including terminal identifiers (AT3, AT2, AT7, AT1, AT8) similar to said unique terminal identifier (AT3) and corresponding to respective terminal stations which have recently logged-in, and in that said terminal identifier list (TT1), for a terminal station (T3) with a substantially fixed location in said telecommunication network, further contains power information indicating a power level at which said terminal station (T3) transmitted a terminal identification message during its most recent log-in attempt.

6. Terminal station (T3) for use in a telecommunication network wherein it is coupled together with other terminal stations (T1, T2) to a main station (MS) for controlling log-in of said terminal station (T3) and each one of said other terminal stations (T1, T2), said terminal station (T3) and said other terminal stations (T1, T2) for communicating with said main station (MS) in a frequency division multiplexed (FDM) way via spectrally separated channels, said terminal station (T3) having a unique terminal identifier (AT3) and including:

a. tuning means, for tuning on a channel out of said channels;

b. receiving means, for receiving via a downstream subchannel of said channel a log-in enable message including a terminal identifier, said log-in enable message for transmission by said main station (MS);

c. message interpreting means, coupled with an input to an output of said receiving means for checking whether said terminal identifier is identical to said unique terminal identifier (AT3) of said terminal station (T3);

d. message generating means, for generating under control of said message interpreting means a terminal identification message including said unique terminal identifier (AT3); and e. transmitting means, coupled with an input to an output of said message generating means for transmitting said terminal identification message towards said main station (MS) via an upstream subchannel of said channel; characterized in that said terminal station (T3) further is equipped with:

f. memory means an output of which is coupled to an input of said tuning means, said memory means for storing adaptable historical information (CT1, CT2, CT3) to be used by said tuning means to select said channel;

wherein from said historical information a terminal identifier list (TT1) is deducible, said terminal identifier list (TT1) including terminal identifiers (AT3, AT2, AT7, AT1, AT8) similar to said unique terminal identifier (AT3) and corresponding to respective terminal stations which have recently logged-in; and wherein said terminal identifier list (TT1), for a terminal station (T3) with a substantially fixed location in said telecommunication network, further contains power information indicating a power level at which said terminal station (T3) transmitted a terminal identification message during its most recent log-in attempt.

7. Main station (T3) for use in a telecommunication network wherein it is coupled together with other terminal stations (T1, T2) to a main station (MS) for controlling log-in of said terminal station (T3) and each one of said other terminal stations (T1, T2), said terminal station (T3) and said other terminal stations (T1, T2) for communicating with said main station (MS) in a frequency division multiplexed (FDM) way via spectrally separated channels, said terminal station (T3) having a unique terminal identifier (AT3) and including:

a. tuning means, for tuning on a channel out of said channels;

b. receiving means, for receiving via a downstream subchannel of said channel a log-in enable message including a terminal identifier, said log-in enable message for transmission by said main station (MS);

c. message interpreting means, coupled with an input to an output of said receiving means for checking whether said terminal identifier is identical to said unique terminal identifier (AT3) of said terminal station (T3);

d. message generating means, for generating under control of said message interpreting means a terminal identification message including said unique terminal identifier (AT3); and e. transmitting means, coupled with an input to an output of said message generating means for transmitting said terminal identification message towards said main station (MS) via an upstream subchannel of said channel; characterized in that said terminal station (T3) further is equipped with:

f. memory means an output of which is coupled to an input of said tuning means, said memory means for storing adaptable historical information (CT1, CT2, CT3) to be used by said tuning means to select said channel, in that from said historical information a terminal identifier list (TT1) is deducible, said terminal identifier list (TT1) including terminal identifiers (AT3, AT2, AT7, AT1, AT8) similar to said unique terminal identifier (AT3) and corresponding to respective terminal stations which have recently logged-in; and in that said terminal identifier list (TT1), for a terminal station (T3) with a substantially fixed location in said telecommunication network, further contains power information indicating a power level at which said terminal station (T3) transmitted a terminal identification message during its most recent log-in attempt.

8. Main station (MS) for use in a telecommunication network wherein it is coupled to a plurality of terminal stations (T1, T2, T3) for controlling log-in of each one of said plurality of terminal stations (T1, T2, T3), said main station (MS) including:

a. selecting means, for selecting a unique terminal identifier (AT3) corresponding to a single terminal station (T3) of said plurality of terminal stations (T1, T2, T3);

b. message generating means, coupled with an input to an output of said selecting means for providing a log-in enable message including said unique terminal identifier (AT3);

c. transmitting means, coupled with an input to an output of said message generating means for broadcasting said log-in enable message to said plurality of terminal stations (T1, T2, T3);

d. receiving means, for receiving a terminal identification message transmitted by said single terminal station (T3) if said single terminal station (T3) elects to become operational; and e. control means, coupled between an output of said receiving means and a control terminal of said selecting means for controlling said selecting means in selecting a next unique terminal identifier (AT2) corresponding to a next terminal station (T2) if no said terminal identification message is received within a predetermined time interval starting when said log-in enable message is broadcasted, characterized in that said main station (MS) further is equipped with:

f. memory means an output of which is coupled to an input of said selecting means for storing adaptable historical information that is used by said selecting means to select said unique terminal identifier (AT3), in that from said historical information a terminal identifier list (TT1) is deducible, said terminal identifier list (TT1) including terminal identifiers (AT3, AT2, AT7, AT1, AT8) similar to said unique terminal identifier (AT3) and corresponding to respective terminal stations which have recently logged-in, and in that said terminal identifier list (TT1), for a terminal station (T3) with a substantially fixed location in said telecommunication network, further contains power information indicating a power level at which said terminal station (T3) transmitted a terminal identification message during its most recent log-in attempt; and in that, if said plurality of terminal stations (T1, T2, T3) communicate with said main station (MS) in a frequency division multiplexed way via channels spectrally separated, from said historical information, a terminal identifier list (TT1, TT2, TT3, TT4) is deducible for each respective channel of said channels, said terminal identifier list (TT1, TT2, TT3, TT4) including terminal identifiers (AT3, AT2, AT7, AT1, AT8; AT2, AT3, AT1, AT9, AT4; AT4, AT6, AT2, AT5, AT9; AT6, AT8, AT7, AT3, AT2) corresponding to terminal stations which have recently logged-in via said respective channel.

9. The main station of claim 8, characterized in that from said historical information a terminal identifier list (TT1) is deducible, said terminal identifier list (TT1) including terminal identifiers (AT3, AT2, AT7, AT1, AT8) similar to said unique terminal identifier (AT3) and corresponding to respective terminal stations which have recently logged-in.

10. Terminal station (T3) for use in a telecommunication network wherein it is coupled together with other terminal stations (T1, T2) to a main station (MS) for controlling log-in of said terminal station (T3) and each one of said other terminal stations (T1, T2), said terminal station (T3) and said other terminal stations (T1, T2) for communicating with said main station (MS) in a frequency division multiplexed (FDM) way via spectrally separated channels, said terminal station (T3) having a unique terminal identifier (AT3) and including:

a. tuning means, for tuning on a channel out of said channels;

b. receiving means, for receiving via a downstream subchannel of said channel a log-in enable message including a terminal identifier, said log-in enable message for transmission by said main station (MS);

c. message interpreting means, coupled with an input to an output of said receiving means for checking whether said terminal identifier is identical to said unique terminal identifier (AT3) of said terminal station (T3);

d. message generating means, for generating under control of said message interpreting means a terminal identification message including said unique terminal identifier (AT3); and e. transmitting means, coupled with an input to an output of said message generating means for transmitting said terminal identification message towards said main station (MS) via an upstream subchannel of said channel; characterized in that said terminal station (T3) further is equipped with:

f. memory means an output of which is coupled to an input of said tuning means, said memory means for storing adaptable historical information (CT1, CT2, CT3) to be used by said tuning means to select said channel, that from said historical information a terminal identifier list (TT1) is deducible, said terminal identifier list (TT1) including terminal identifiers (AT3, AT2, AT7, AT1, AT8) similar to said unique terminal identifier (AT3) and corresponding to respective terminal stations which have recently logged-in; and in that said terminal identifier list (TT1), for a terminal station (T3) with a substantially fixed location in said telecommunication network, further contains delay information indicating a delay time interval that was respected by said terminal station (T3) between receipt of a log-in enable message and transmission of a terminal identification message during its most recent log-in attempt.

11. Terminal station (T3) for use in a telecommunication network wherein it is coupled together with other terminal stations (T1, T2) to a main station (MS) for controlling log-in of said terminal station (T3) and each one of said other terminal stations (T1, T2), said terminal station (T3) and said other terminal stations (T1, T2) for communicating with said main station (MS) in a frequency division multiplexed (FDM) way via spectrally separated channels, said terminal station (T3) having a unique terminal identifier (AT3) and including:

a. tuning means, for tuning on a channel out of said channels;

b. receiving means, for receiving via a downstream subchannel of said channel a log-in enable message including a terminal identifier, said log-in enable message for transmission by said main station (MS);

c. message interpreting means, coupled with an input to an output of said receiving means for checking whether said terminal identifier is identical to said unique terminal identifier (AT3) of said terminal station (T3);

d. message generating means, for generating under control of said message interpreting means a terminal identification message including said unique terminal identifier (AT3); and e. transmitting means, coupled with an input to an output of said message generating means for transmitting said terminal identification message towards said main station (MS) via an upstream subchannel of said channel; characterized in that said terminal station (T3) further is equipped with:

f. memory means an output of which is coupled to an input of said tuning means, said memory means for storing adaptable historical information (CT1, CT2, CT3) to be used by said tuning means to select said channel, and in that, if said plurality of terminal stations (T1, T2, T3) communicate with said main station (MS) in a frequency division multiplexed way via channels spectrally separated, from said historical information, a terminal identifier list (TT1, TT2, TT3, TT4) is deducible for each respective channel of said channels, said terminal identifier list (TT1, TT2, TT3, TT4) including terminal identifiers (AT3, AT2, AT7, AT1, AT8; AT2, AT3, AT1, AT9, AT4; AT4, AT6, AT2, AT5, AT9; AT6, AT8, AT7, AT3, AT2) corresponding to terminal stations which have recently logged-in via said respective channel.

12. Terminal station of claim 11, characterized in that each one (T1) of said plurality of terminal stations (T1, T2, T3) memorizes and regularly updates a channel identifier list (CT1) which contains references (IC3, IC6, IC2, IC7, IC1) to some of said channels that were recently used by said terminal station (T1) to attempt to log-in.

\* \* \* \* \*

UNITED STATES PATENT AND TRADEMARK OFFICE
CERTIFICATE OF CORRECTION

PATENT NO : 6,002,680
DATED : December 14, 1999
INVENTOR(S): Sierens et al

It is certified that error appears in the above-identified patent and that said Letters Patent is hereby corrected as shown below:

Title page, item [56] "References Cited", at line 7, please cancel "5,419,777" and substitute --5,416,777-- therefor.

At col. 15, line 43 (claim 3, line 27), please insert a comma after "(AT3)".

Signed and Sealed this

Twelfth Day of September, 2000

Attest:

Q. TODD DICKINSON

Attesting Officer

Director of Patents and Trademarks